United States Patent
Panian (10) Patent No.: US 6,285,890 B1
(45) Date of Patent: Sep. 4, 2001

(54) AUTOMATIC SENSING OF COMMUNICATION OR ACCESSORIES FOR MOBILE TERMINALS

(75) Inventor: Jim Panian, Cary, NC (US)

(73) Assignee: Ericsson, Inc., Research Triangle Park, NC (US)

( * ) Notice: Subject to any disclaimer, the term of this patent is extended or adjusted under 35 U.S.C. 154(b) by 0 days.

(21) Appl. No.: 09/237,587

(22) Filed: Jan. 26, 1999

(51) Int. Cl.⁷ .................................................. H04B 1/38
(52) U.S. Cl. ........................... 455/557; 455/550; 455/575
(58) Field of Search .................... 455/557, 426, 455/556, 550, 575, 90

(56) References Cited

U.S. PATENT DOCUMENTS

| | | | |
|---|---|---|---|
| 4,972,457 | * 11/1990 | O'Sullivan | 455/556 |
| 5,479,479 | * 12/1995 | Braitberg et al. | 455/404 |
| 5,568,536 | * 10/1996 | Tiller et al. | 455/557 |
| 5,781,612 | 7/1998 | Choi et al. | 455/435 |
| 5,793,843 | * 8/1998 | Morris | 455/557 |
| 5,802,483 | * 9/1998 | Morris | 455/557 |
| 5,864,763 | * 1/1999 | Leung et al. | 455/557 |
| 5,884,191 | * 3/1999 | Karpus et al. | 455/557 |
| 5,956,651 | * 9/1999 | Wilkie et al. | 455/558 |
| 5,983,100 | * 11/1999 | Johansson et al. | 455/575 |
| 6,006,109 | * 12/1999 | Shin | 455/557 |

FOREIGN PATENT DOCUMENTS

| | | | |
|---|---|---|---|
| 2325820 | 12/1998 | (GB) | H04Q/7/32 |
| 94/09586 | 4/1994 | (WO) | H04M/11/00 |
| 98/14022 | 4/1999 | (WO) | H04Q/7/32 |

* cited by examiner

*Primary Examiner*—William Trost
*Assistant Examiner*—Rafael Perez-Gutierrez
(74) *Attorney, Agent, or Firm*—Coats & Bennett (57) ABSTRACT

A mobile communication device has data/fax capabilities to enable data/fax communications by a connected communication terminal. The mobile communication device includes a system interface that is used in a default mode to connect the phone to a phone accessory. The system interface is also used to connect a communication terminal to the phone for data/fax communications in a communication mode. The phone detects the presence of the communication terminal when a communication session is initiated by the communication terminal and automatically changes to a communication mode without user input.

16 Claims, 5 Drawing Sheets

AUTOMATIC SENSING OF COMMUNICATION OR ACCESSORIES FOR MOBILE TERMINALS

BACKGROUND OF THE INVENTION

The present invention relates to improvements in mobile phones which have system connectors to permit auxiliary components to be connected to them.

Mobile phones have become popular in recent years because they free the user from fixed communications networks. The user is not required to wait at the home or office for an anticipated call. Instead, the call can be forwarded to the user at whatever location the user happens to be.

A wide variety of phone accessories are available to enhance the usefulness of mobile phone. Common accessories for mobile phones include hand sets, vibrators, speech recognition units, hands-free kits for vehicles, and battery chargers. Typically, the phone accessories plug into a system connector on the body of the telephone to connect the electrical circuit within the accessory to the circuit inside the telephone. Telephones manufactured by Ericsson, Inc., for example, have a class of such accessories known generally as "Ericsson Accessories" which can be connected using the phone's existing system connector.

It is also known to use the telephone as a transmission medium for a connected computer to enable the user to send and receive data and fax communications. One approach used in the past is to connect the phone to an external modem or modem equipped computer. This approach uses the mobile phone merely for transmission of signals that are modulated by the modem in the computer. For example, some phones implement a PC card form factor to provide data/fax functionality for a mobile computer equipped with a PC card slot. However, the PC card adds an additional expense for users that want data/fax functionality.

Another approach is to incorporate an internal modem into the mobile phone and provide an interface for accessing the phone's internal modem using a computer or other external device. This approach can be implemented using a dedicated port on the phone or the phone's built-in system connector for communications with the external device. For example, some phones use an infrared data port for communications with the external device. In the past, phones adopting this approach have required that special protocol drivers be installed in the external device in order to operate properly. Thus, the manufacturer was required to write and distribute drivers for many different operating systems such as Windows 3.1, Windows 95, Windows 98, Palm Pilot, Windows CE, etc. Moreover, if the user installs a new operating system, there is no guarantee that the driver will operate. Thus, the user may be required to obtain and install a new infrared driver when a new operating system is installed.

Another drawback to using a dedicated port for communications with an external device, is that the dedicated port requires additional space and adds to the cost of the phone. In particular, the use of a separate infrared data port requires a separate transmitter in the phone and significantly increases its cost and weight.

Accordingly, it would be preferable to have a telephone design in which a single system connector could be used to connect accessories as well as computing devices, without the need to provide additional drivers for the mobile computer to properly operate with the telephone.

SUMMARY OF THE INVENTION

The present invention is a mobile communication device, such as a cellular telephone, equipped to handle data/fax communications. The phone includes a transceiver, a modem, and a system connector for connecting the mobile communication device to external devices. The system connector serves a dual function. In a default mode of operation, the system connector may be used to connect the phone to a phone accessory, such as hands-free kit, charger, etc. In a communications mode, the system connector is used to connect the phone to an external communication terminal that uses the phone's internal modem for data/fax communications.

The phone initially operates in a default mode to enable use of the phone with a phone accessory in a conventional manner. The phone automatically switches to a communications mode when a connected communication terminal is detected by the phone. The presence of an external communication terminal is detected, for example, by looking at the input signals on the system connector. The connected communication terminal will generate certain known signals when it initiates a communication session. For example, a communication terminal implementing the IS-135 protocol will send AT commands to the phone's internal modem over the system connector. When the input signal (AT command) is received on the system connector the phone automatically switches to the communication mode to enable communications by said external communications terminal via said modem. When the communication session is terminated, the phone automatically switches back to the default mode of operation.

The present invention is convenient for users since the user does not need to manually configure the phone for data/fax communications. It is also advantageous from a manufacturer's viewpoint since no drivers are needed to facilitate communications with the connected device.

These and other aspects of the present invention will become apparent to those skilled in the art after reading the following description of the preferred embodiments when considered with the drawings.

BRIEF DESCRIPTION OF THE DRAWINGS

The invention will be better understood after a reading of the Detailed Description of the Preferred Embodiment and a review of the drawings in which.

DETAILED DESCRIPTION OF THE PREFERRED EMBODIMENT

Referring now to the drawings, the mobile communication device of the present invention is shown therein and indicated generally by the numeral 10. The mobile communication device 10 can be used in a Default mode as a conventional mobile telephone to transmit and receive voice and data signals according to known standards, such as IS-136. Alternately, the mobile communication device 10 can be used in a Communication mode as a facsimile machine or modem to send and receive data and fax communications. In the Communication mode, the mobile communication device 10 functions as the Data Communications Equipment (DCE) for a connected computer or Data Terminal Equipment (DTE). The term mode when used in reference to the mobile communication device 10 refers to the overall operating mode of the device.

Figure 1:
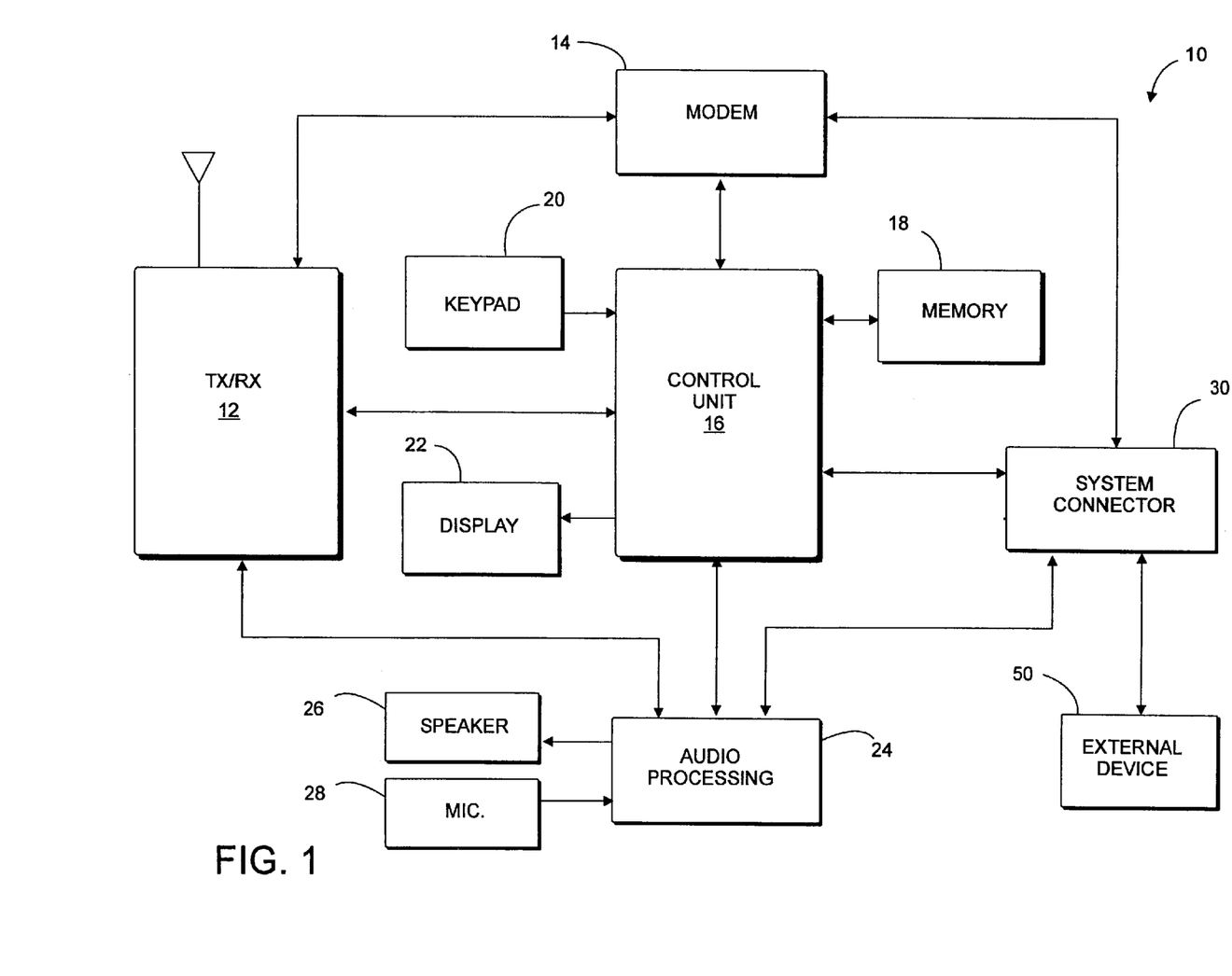
FIG. 1 is a schematic block diagram of a mobile phone according to an embodiment of the invention.

FIG. 1 is a block diagram showing the basic components of a mobile communication device 10 of the present invention. The mobile communication device 10 includes a transceiver 12, a modem 14, a control unit 16, a memory 18, a keypad 20, a display 22, audio processing circuits 24, a speaker 26, and a microphone 28. A system interface 30 is provided for connecting phone accessories and other external devices 50 to the mobile communication device 10. Examples of phone accessories include a battery charger, a portable hands-free kit, a car kit for a vehicle, and an AMPS modem. The system interface 30 can also be used to connect a computer or other external communication device 50 to the mobile communication device 10. The computer or other external communication device can then use the internal modem 14 of the mobile communication device 10 for data, facsimile, or voice communications as will be hereinafter described.

The RF transceiver 12 may be, for example, a class 1 mobile phone transceiver capable of transmitting radio signals to and receiving radio signals from remote stations. In the preferred embodiment of the invention, the transceiver 12 is a fully functional digital transceiver implementing the IS-136 protocol which is incorporated herein by reference. However those skilled in the art will recognize that the present invention is not limited to digital transceivers. Also, there are numerous protocols that could be used in connection with the present invention other than IS-136.

The modem 14 handles data communications between the mobile communication device 10 and the external device 50 in both the Default mode and in the Communication mode. The modem 14 may, for example, be a conventional modem that implements the IS-135 standard, which is incorporated herein by reference, although the invention is not limited to modems 14 using this standard. Functions performed by the modem include character formatting, framing, parity checking, autobauding, and flow control. Also, those skilled in the art will recognize that the mobile communication device 10 may include only the front end of the modem 14. The back end of the modem 14 may be located elsewhere in the communication network. Thus, the essential aspect of the invention is that the mobile communication device have circuits providing, either alone or in conjunction with the communication network, modem/fax capability.

The control unit 16 controls the operation of the transceiver 12 and modem 14 according to instructions stored in memory 18. One function performed by the control unit 16 that is pertinent to the present invention is AT command processing. AT command processing is handled by the control unit 16 according to known standards, such as TIA IS-136 and IS-707, which are incorporated herein by reference. Memory 18 is used for temporarily storing data that is needed by the control unit 16 during operation of the mobile communication device 10. Memory 18 includes both permanent ROM memory for program storage and RAM memory. Memory 18 is used to store a list of AT modem commands, that is used to detect the presence of an external computer or other DTE equipment, as will be hereinafter described.

The keypad 20, display 22, microphone 28 and speaker 26 provide an man-machine interface (MMI) for the user of the mobile communication device 10. The keypad 20 is used by the user to enter data and commands. For example, a common use for the keypad 20 would be to enter a telephone number and "send" command to place an outgoing call. The display 22 is used to display information, such as the number dialed and call status information, to the user. The display 22 can also be used to display prompts or other messages. Microphone 28 converts the user's voice into audio signals that are to be transmitted by the mobile communication device 10. The speaker 26 converts audio signals received by the mobile communication device 10 into audible sounds that can be heard by the user. Audio processing unit 24 interfaces with the microphone 28 and speaker 26 with the control unit 16. Audio processing unit 24 processes voice and data signals that are transmitted to and received by the mobile communication device 10.

The system interface 30 is used to connect the mobile communication device 10 to external devices 50, such as a phone accessory, computer, or DTE equipment. The system interface 30 is used to connect phone accessories to the mobile communication device 10 in for use in the Default mode, and to connect an external computer or other DTE in the Communication mode. The signals present at the system interface 30 will change depending on the type of external device, i.e. phone accessory or DTE device.

Figure 2A:
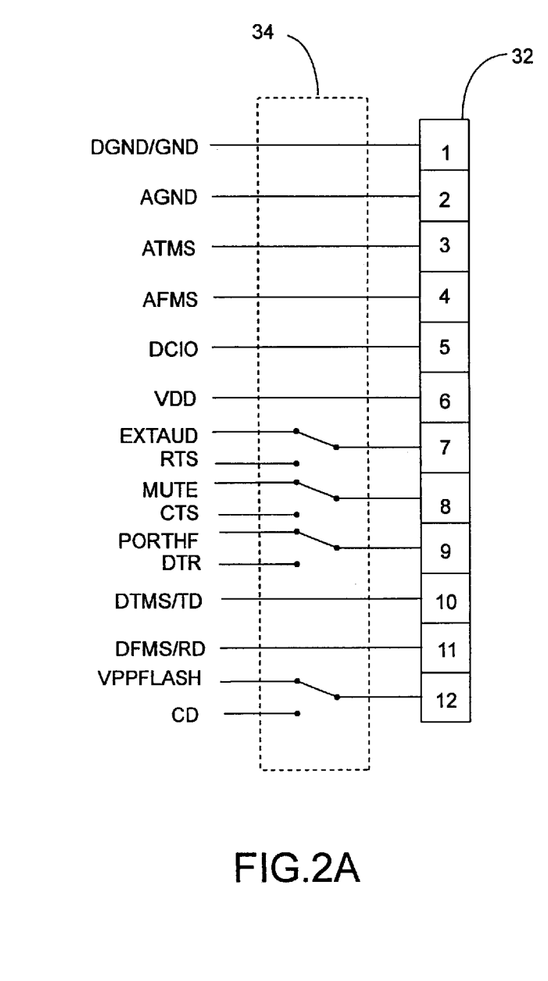
FIG. 2A is a schematic block diagram of the system interface in Default mode.
Figure 2B:
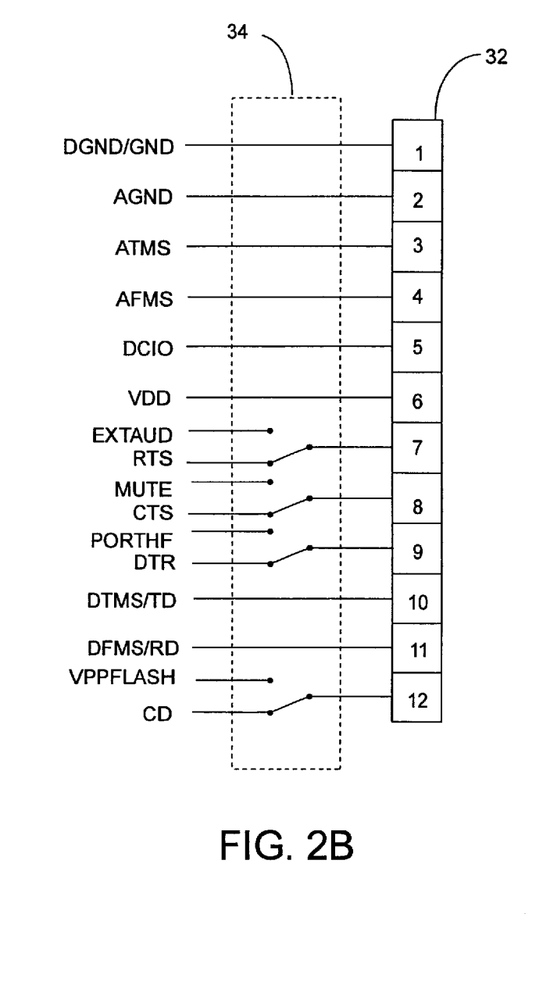
FIG. 2B is a schematic block diagram of the system interface in Communication mode.

The system interface 30 includes a system connector 32 and switching circuits 34 as shown in FIGS. 2A and 2B. The system connector 32 is a physical connector in any suitable form, such as a plug, that connects to the external device 50. The system connector 32 is interfaced with the control unit 16, modem 14, audio processing circuit 24, and memory 18 by the switching circuit 34. The switching circuit 34 functions to redirect the inputs and outputs at the system connector 32 depending on the type of external device 50 that is connected. When a phone accessory or AMPS modem is connected, the switching circuits 34 are configured in a Default mode, as shown in FIG. 2A. When an external communication terminal is connected, the switching circuits 34 are configured in a Communication mode, as shown in FIG. 2B. The term mode when used in reference to the system interface means the configuration of the system interface 30 when the mobile communication device 10 is in the various operating modes. Thus, the Default mode of the system interface 30 means the configuration of the interface when the phone is in the Default mode of operation.

The control unit 16 monitors signals present at the system connector 32 and automatically configures the system interface 30 depending on the signals detected so that the signals are routed to the appropriate destinations. A phone accessory, for example, will generate different signals than an external computer attempting a data/fax communication. When an accessory is connected to the system connector 32, the control unit 16 configures the system interface 30 in a Default mode for use with the accessory and routes the signals accordingly. When an external computer or other DTE is connected to the system connector 32, the control unit 16 configures the system interface 30 in a Communication mode for data/fax communications. In the preferred embodiment of the invention, the system interface 30 is configured as an RS-232 interface in the Communication mode. One advantage of configuring the system interface 30 as an RS-232 interface is that no drivers are required to be installed on the computer or DTE for it to operate properly.

In the preferred embodiment of the invention, the control unit 16 initially configures the system interface 30 in the Default mode. The system interface 30 remains in Default mode until the control unit 16 detects certain standard AT commands at the system interface 30 that are sent by a computer attempting to initiate a communication session. These AT commands are listed in Table 1 in the attached Appendix. These commands are referred to herein as modem commands or AT commands. When one of the AT commands listed in Table 1 is detected, the mobile communication device 10 switches from the Default mode to the Communication mode. The mobile communication device 10 switches back to Default mode when the control unit 16 senses that the computer or DTE is no longer connected. The mobile communication device 10 also switches to Default mode when powered on/off or when receiving certain AT commands generated by an AMPS modem.

In the disclosed embodiment, the system interface 30 has 12 I/O ports. The system connector has 12 pins (not shown), each one corresponding to a particular I/O port. Table 2 contains a listing of the signals at each I/O port in both the Default mode and Communication mode. The disclosed embodiment is merely one representative embodiment and those skilled in the art will recognize that the particular signals and how the signals are used is not an essential aspect of the invention.

In the Default mode, the signals present at the system interface 30 include the ATMS signal (port 3), the AFMS signal (port 4), the EXTAUD signal-(port 7), the PORTHF signal (port 9), the MUTE signal (port 8), the DTMS signal-(port 10), the DFMS signal-(port 11), the VPPFLASH signal (port 12), and the AGND signal (port 2). This group of signals is used in phones manufactured by Ericsson, Inc. and represents only one exemplary embodiment. Phones made by other manufacturers may use a completely different set of signals in the Default mode of operation. In other words, the particular signals used in the Default mode will generally vary from one manufacturer to the next.

The AFMS (audio from mobile station) and ATMS (audio to mobile station) signals are used in Default mode to interface the phone's audio circuits 24 with the phone accessory in the Default mode of operation. The EXTAUD and PORTHF signals are inputs used to detect when the mobile communication device 10 is connected to a car kit or portable hands-free kit respectively. When either the EXTAUD or PORTHF signals are present, the phone's audio circuits 24 direct audio output to the AFMS line and receive audio input on the ATMS line. The AFMS and ATMS signals are not used in Communications mode. The MUTE signal is an output used when the mobile communication device 10 is connected to a car kit to mute the car's stereo system when a call is in progress. The DTMS (data to mobile station) and DFMS (data from mobile station) signals are used in the Default mode to transfer data signals between the phone and the connected phone accessory. The VPPFLASH signal is an input that is used to load programs in flash memory. The AGND (audio ground) signal is used to ground the audio circuits 24 of the mobile communication device 10 when a phone accessory is attached.

In Communication mode, the signals present at the system interface include the RTS signal (port 7), the CTS signal (port 8), the DTR signal (port 9), the TD signal (port 10), the RD signal (port 11), and the CD signal (port 12). These signals are described in TIA IS-135 which is incorporated herein by reference. To briefly summarize, the RTS signal is an input that is used for flow control by the modem's flow control circuit when receiving data. The CTS signal is an output that is used by the modem's flow control circuit when transmitting data. The DTR signal is an input that is used to indicate the readiness of the data terminal equipment. The TD (transmit data) signal and RD (receive data) signal are used to transfer data between the connected communication terminal and the mobile communication device 10. The TD signal is the data being transmitted. The RD signal is the data being received. The CD (carrier detect) signal is an output that is passed from the phone's modem 14 to the connected communication terminal to indicate connection to a carrier.

The VDD signal, DGND signal, and DCIO signal are used in both Default mode and Communication mode. The VDD port on the system interface 30 is used to output a reference voltage to a connected device, either a phone accessory or a communication terminal. The DGND/GND (digital ground) port is used as a ground in both Default mode and Communication mode. DCIO is used as a power input to the mobile communication device 10 in both Default mode and Communication mode. These ports are not reconfigured when the mobile communication device 10 changes mode.

In Default mode, ports 7 (EXTAUD), 8 (MUTE), and 9 (PORTHF) serve as an interface between the phone accessory and the audio circuits 24 of the mobile communication device 10. In Communication mode, ports 7-(RTS), 8 (CTS), and 9 (DTR) interface the communication terminal to the modem 14 in the mobile communication device 10. Therefore, it is necessary to redirect the signals at these ports when changing modes. Similarly, in Default mode, port 12 (VPPFLASH) is connected to flash memory 18. In Communication mode, port 12 (CD) is connected to the modem 14. Thus, the signal at port 12 (VPPFLASH/CD) must also be redirected. Redirection of the signals is accomplished by switching the inputs and outputs as shown schematically in FIGS. 2A and 2B when changing between modes. The switching function is performed by the switching circuit 34 in response to a control signal from the control unit 16. However, it is not essential that the control unit 16 control the switching circuit 34. The switching circuit 34 could, for example, include its own hardwired logic. Also, the switching circuit 34 could comprise a transistor network that automatically redirects the signals without external (to the switching circuit) input. These switching techniques are well-known to those skilled in the art.

TABLE 2

System Connector Interface Signals

| Port No. | Default Mode | Communication Mode |
|---|---|---|
| 1 | DGND<br>Used as ground for digital circuits | GND<br>Used as ground for all RS-232 signals |
| 2 | AGND<br>Used as ground for audio circuit | |
| 3 | ATMS<br>Used to input audio signal to mobile terminal | |
| 4 | AFMS<br>Used to output audio from mobile terminal | |
| 5 | DCIO<br>Used to charge mobile terminal battery | DCIO<br>Power input to the cable for level shifting |
| 6 | VDD<br>Used to output voltage reference | VDD<br>Used to output voltage reference |
| 7 | EXTAUD<br>Input used to indicate connection to car kit | RTS<br>Input used for the Ready for Receiving hardware flow control circuit. The RTS signal is held in the Space state and not used for flow control if an AT +IFC or |

TABLE 2-continued

System Connector Interface Signals

| Port No. | Default Mode | Communication Mode |
| --- | --- | --- |
| 8 | MUTE<br>Output used to mute car stereo | AT_FLO command is received that disables hardware flow control.<br>CTS<br>Output used for the Ready for Sending hardware flow control circuit. The CTS signal is not use for flow control if an AT +IFC or AT +FLO command is received that disables hardware flow control. |
| 9 | PORTHF<br>Input used to indicate connection to portable hands-free kit, such as a headset | DTR<br>Input used for the Data Terminal Ready circuit. The interpretation of the DTR signal can be reprogrammed when the AT &Dn command. |
| 10 | DTMS<br>Used to input data to mobile terminal | TD<br>Input used by the DTE to send data via mobile terminal |
| 11 | DFMS<br>Used to output data from mobile terminal | RD<br>Output used by the DTE to receive data via mobile terminal |
| 12 | VPPFLASH<br>Input used to load program into flash memory | CD<br>Output used to indicate connection to a carrier |

Figure 3:
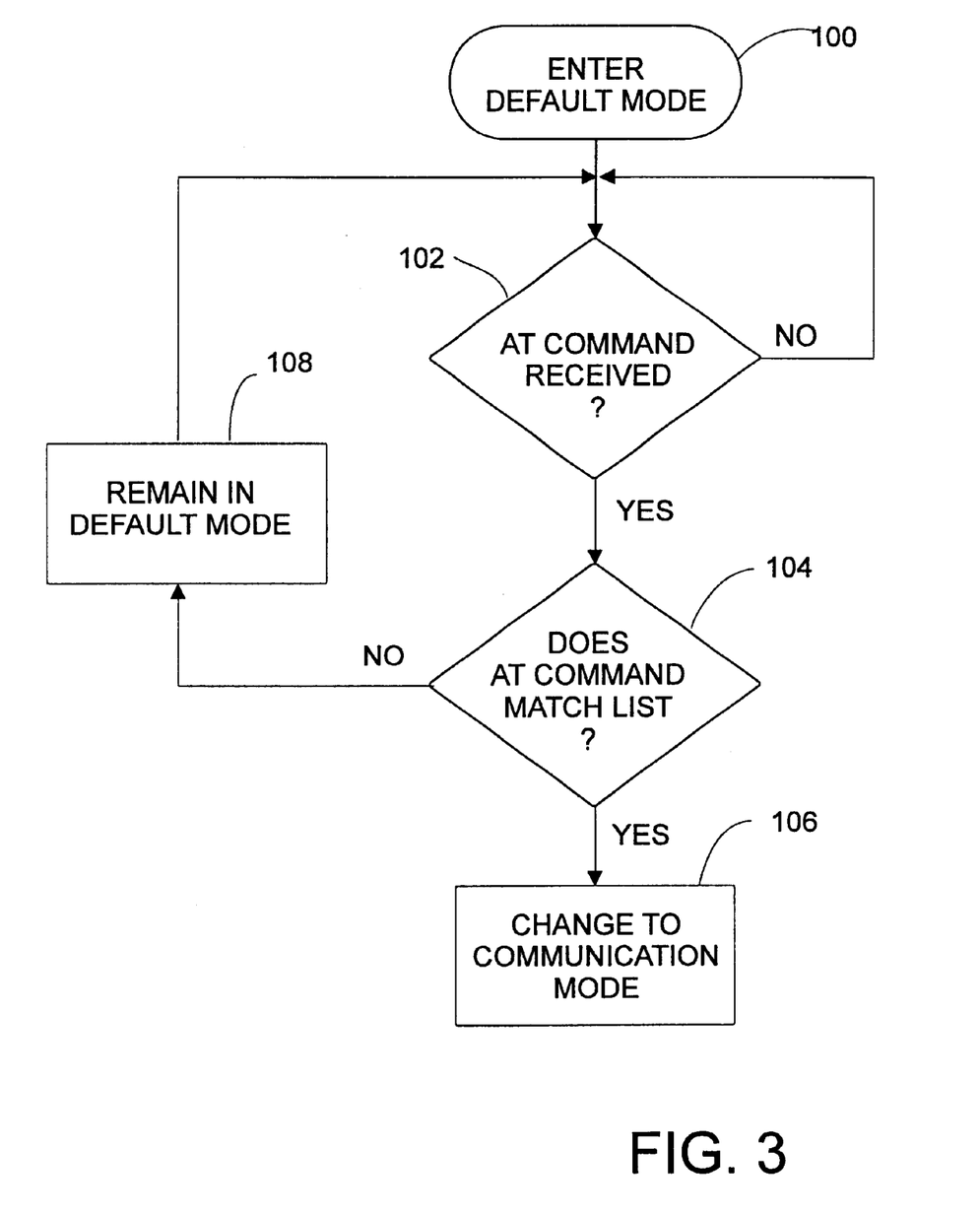
FIG. 3 is a flow chart illustrating a procedure for changing from Default mode to Communication mode.
Figure 4A:
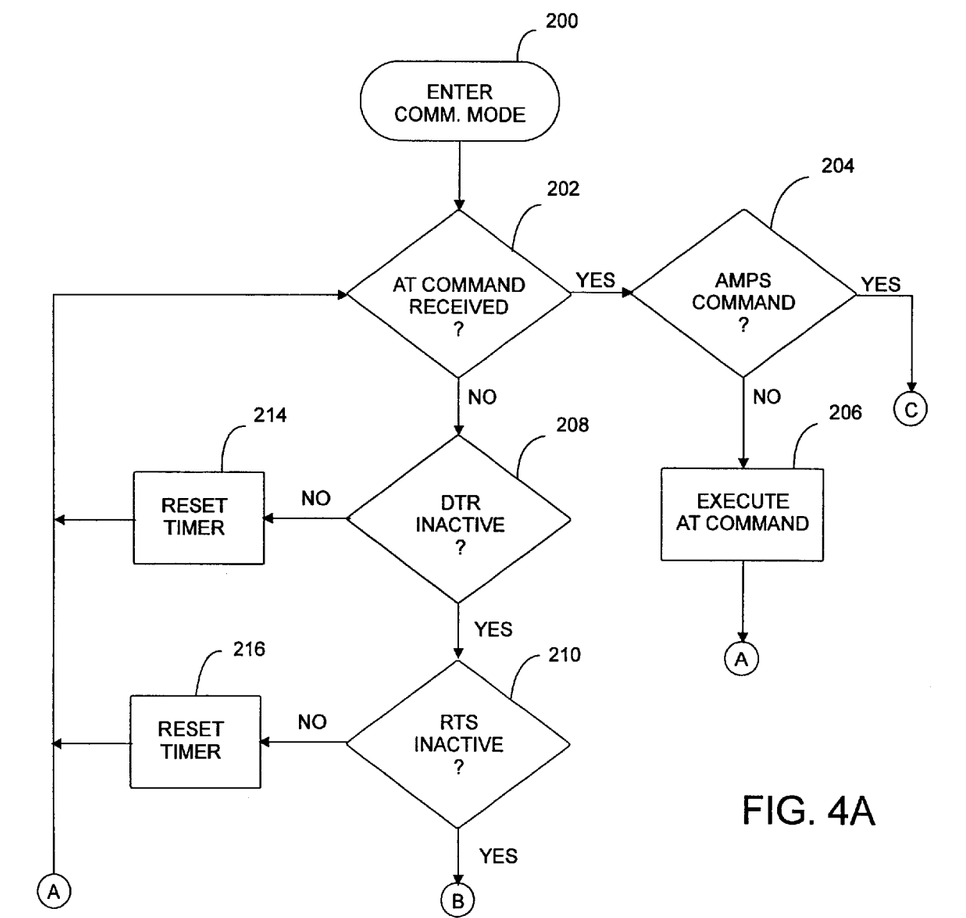
FIGS. 4A and 4B are flow charts illustrating a procedure for changing from Communication mode to Default mode.
Figure 4B:
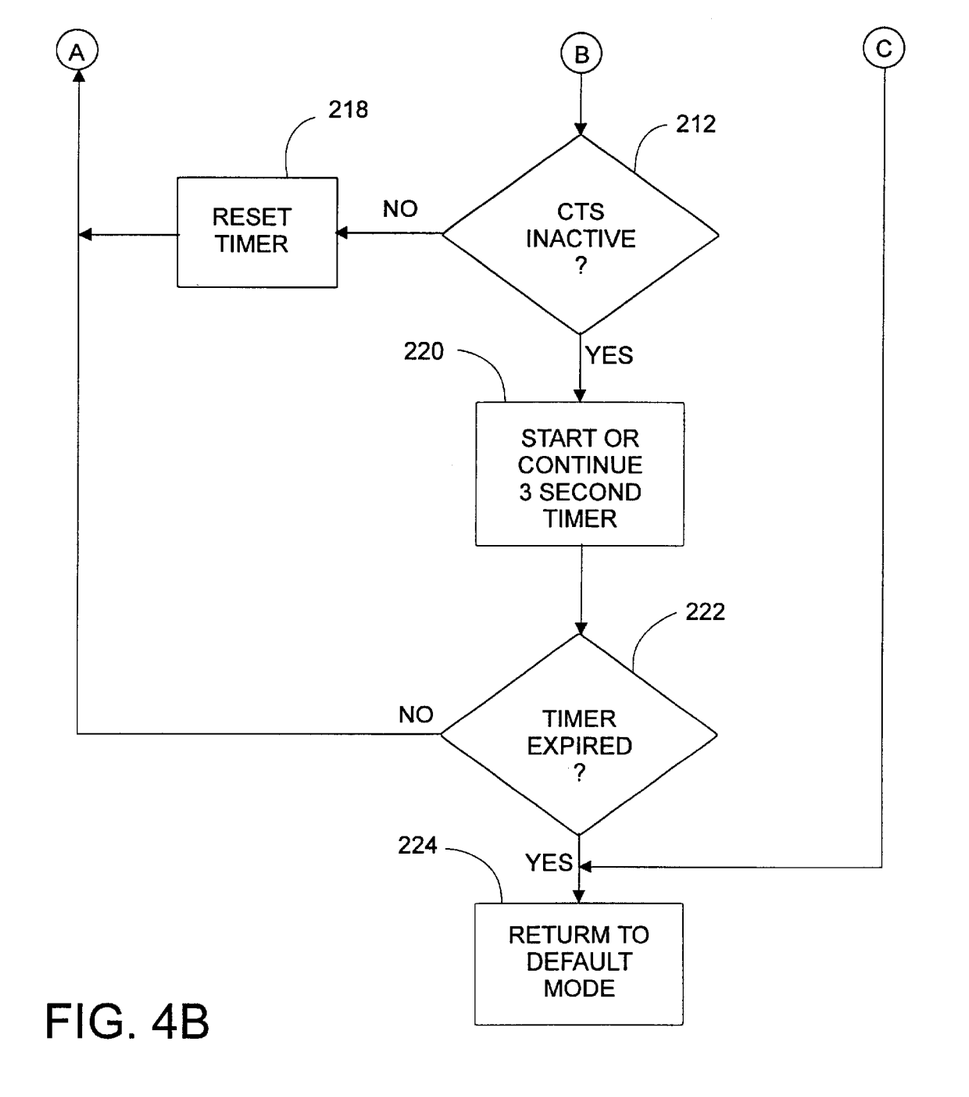

FIGS. 3 and 4 are flow diagrams illustrating the operation of the mobile communication device 10 of the present invention. FIG. 3 illustrates the procedure for switching from Default mode to Communication mode. The mobile communication device 10 begins in the Default mode (block 100). When a computer or DTE connected to the system interface 30 initiates a data/fax communication, it will send one or more of the AT commands listed in Table 1 to the mobile communication device 10. The AT command will be input on the DTMS port and placed in a buffer. The control unit 16 reads the data in the buffer and performs AT command processing. If an AT command line having more than one AT command is received, the command line is parsed by the control unit 16. When an AT command is detected (block 102), the control unit 16 will compare the received AT command to the AT command list stored in memory 18 (block 104). If the received AT command matches one of the commands on the command list stored in memory 18, the control unit 16 configures the system connector 32 in the Communication mode (block 106). Otherwise, the control unit 16 executes the AT command if the command is recognized by the control unit 16 (block 108).

FIG. 4 illustrates the procedure for changing from Communication mode back to the Default mode. In the Communication mode, the mobile communication device 10 continuously monitors or polls the DTR, RTS, and CTS ports (blocks 208, 210, and 212). If the DTR, CTS and RTS signals are all inactive, the control unit 16 either starts or continues a 3 second timer (block 220). During the ensuing 3 second interval, the control unit 16 continues to monitor the DTR, CTS and RTS signals. If one of these signals becomes active before the timer expires, the control unit 16 resets the timer (blocks 214, 216, 218). If neither signal becomes active during the 3 second interval (block 222), the control unit 16 assumes that the computer has been disconnected and switches to Default mode (block 224).

If an AT command is received while the DTR, RTS and CTS ports are being monitored (block 202), the control unit 16 processes the AT command. AT commands are received on the TD port. The control unit 16 compares the received AT command to a shortened command list of AMPS modem commands (block 204). If the AT command matches one of the commands in the AMPS modem command list, then the mobile communication device 10 switches back to Default mode (block 224). More particularly, the control unit 16 looks for the commands ATWS46=7 or ATWS46=243. If either of these AT commands is received, the control unit 16 will assume that a standard AMPS modem, which uses the Default mode, is connected and will switch back to Default mode (block 224). Otherwise, standard AT command processing according to IS-135 is invoked (block 206) and the control unit 16 returns to monitoring the DTR, RTS, and CTS ports (blocks 208, 210, and 212).

The present invention avoids the need to manually configure the mobile communication device 10 for data/fax communications before connecting the mobile communication device 10 to the computer. Instead, the user simply connects the computer to the phone's system connector 32 and initiates communications. The phone autodetects the presence of the computer and automatically switches to Communication mode. Thus, the present invention is convenient for consumers to use.

The present invention is also advantageous to manufacturers of phones and other mobile communication devices. The present invention avoids the need to develop, install and update drivers for various types of computing devices. The mobile communication device of the present invention can connect to any class of device that implements protocols recognized by the mobile communication device 10. In the disclosed embodiment, the mobile communication device 10 is programmed to implement the IS-135 protocol in Communication mode. Therefore, the mobile communication device can be connected to any computing device that complies with IS-135 protocol.

What is claimed is:

1. A mobile communication device comprising:

a.) a transceiver for transmitting and receiving signals;

b.) a modem operatively connected to said transceiver;

c.) a configurable system interface comprising a plurality of electrical contacts and a switching circuit, said system interface having a default configuration corresponding to a default mode of operation for connecting said mobile communication device to an external phone accessory, and a communication configuration corresponding to a communication mode of operation for connecting said mobile communication device to an external communication terminal capable of data, fax and/or voice communications, wherein said switching circuit connects said contacts to said transceiver according to a first mapping in said default mode and according to a second mapping in said communication mode;

d.) a control unit operative in said default mode of operation to enable use of a connected phone accessory and in said communications mode to enable data, fax and voice communications by a connected communications terminal via said modem; and e.) wherein said control unit is operative to change said system interface from said default configuration to said communication configuration in response to receipt of a first predetermined input signal on a data input circuit of said system interface from said connected communication terminal.

2. The mobile communication device according to claim 1 wherein said control unit is operative to change said system interface from said communication configuration to said default configuration upon receipt of a second predetermined input signal on a data input circuit of said system interface from said external communication terminal.

3. The mobile communication device according to claim 2 wherein said second predetermined input signal is a modem command from said external communication terminal.

4. The mobile communication device according to claim 3 wherein said second predetermined input signal is an AMPS AT command.

5. The mobile communication device according to claim 4 wherein said control unit is operative to configure said system interface in said default configuration at power on.

6. The mobile communication device according to claim 1 wherein said control unit is operative to change said system interface from said communication configuration to said default configuration upon termination of a communication session by said external communication terminal.

7. The mobile communication device according to claim 1 wherein said first predetermined input signal is a modem command from said external communication terminal.

8. The mobile communication device according to claim 1 wherein said first predetermined input signal is a modem command recognized by the IS-135 protocol.

9. A method for configuring a system interface for a mobile communication device comprising a plurality of electrical contacts and a switching circuit, that alternately connects to an external communication terminal or an external phone accessory comprising:

a.) placing said system interface in a default configuration wherein said switching circuit connects said contacts to circuits within said mobile communication device according to a first mapping to enable use of said mobile communication device with a connected phone accessory;

b.) receiving a first predetermined input signal on a data input circuit of said system interface from an external communication terminal attempting to initiate a communication session for a data, voice or fax communication requiring a modem; and c.) placing said system interface in a communication configuration wherein said switching circuit connects said contacts to said circuits within said mobile communication device according to a second mapping in response to receipt of said first predetermined input signal to enable communications by said external communications terminal via said modem.

10. The method according to claim 9 further including placing said system interface in said default configuration upon termination of a communication session by said external communication terminal.

11. The method according to claim 9 further including changing said system interface from said communication configuration to said default configuration upon receipt of a second predetermined input signal on a data input circuit of said system interface from said external communication terminal.

12. The method according to claim 11 wherein said second predetermined input signal is a modem command from said external communication terminal.

13. The method according to claim 12 wherein said second predetermined input signal is an AMPS AT command.

14. The method according to claim 9 wherein said first predetermined input signal is a modem command from said external communication terminal.

15. The method according to claim 14 wherein said first predetermined input signal is a modem command recognized by the IS-135 protocol.

16. The method according to claim 9 further including the step of configuring said system interface in said default configuration at power on.

* * * * *